United States Patent [19]

Grogan

[11] 3,891,061
[45] June 24, 1975

[54] CONVEYOR SYSTEM

[76] Inventor: Daniel W. Grogan, 832 South Main, Dyersburg, Tenn. 38024

[22] Filed: Nov. 19, 1973

[21] Appl. No.: 416,841

[52] U.S. Cl. .................................. 186/14; 198/130
[51] Int. Cl. ............................................. B61b 9/00
[58] Field of Search ....... 198/28, 65, 130, 133, 179, 198/180; 104/173 R, 173 ST; 24/84 H, 255 A; 248/214, 316 B, 489, 495; 186/14–16, 32, 26

[56] References Cited
UNITED STATES PATENTS

| | | | |
|---|---|---|---|
| 647,449 | 4/1900 | Johnston | 198/130 |
| 1,761,188 | 6/1930 | Bixler et al. | 198/28 |
| 1,783,578 | 12/1930 | Mandy | 24/84 H |
| 2,526,536 | 10/1970 | Bryan et al. | 198/179 |
| 2,582,178 | 1/1952 | Thompson | 198/130 |
| 3,164,245 | 1/1965 | Juengel | 198/130 |

FOREIGN PATENTS OR APPLICATIONS
18,925  5/1910  United Kingdom.............. 24/255 A Primary Examiner—Evon C. Blunk
Assistant Examiner—Joseph E. Valenza
Attorney, Agent, or Firm—Clarence A. O'Brien; Harvey B. Jacobson

[57] ABSTRACT

A conveyor system has an endless conveyor arranged for providing a conveyor path from a food service area to a food order filling area, and a gravity conveyor receiving orders from the endless conveyor at the order filling area and moving the orders to an associated work station for processing. Balanced clips are used to guide the orders along the endless and gravity conveyors. The clips are returned to the service area from the order filling area via the endless conveyor for reuse.

5 Claims, 6 Drawing Figures

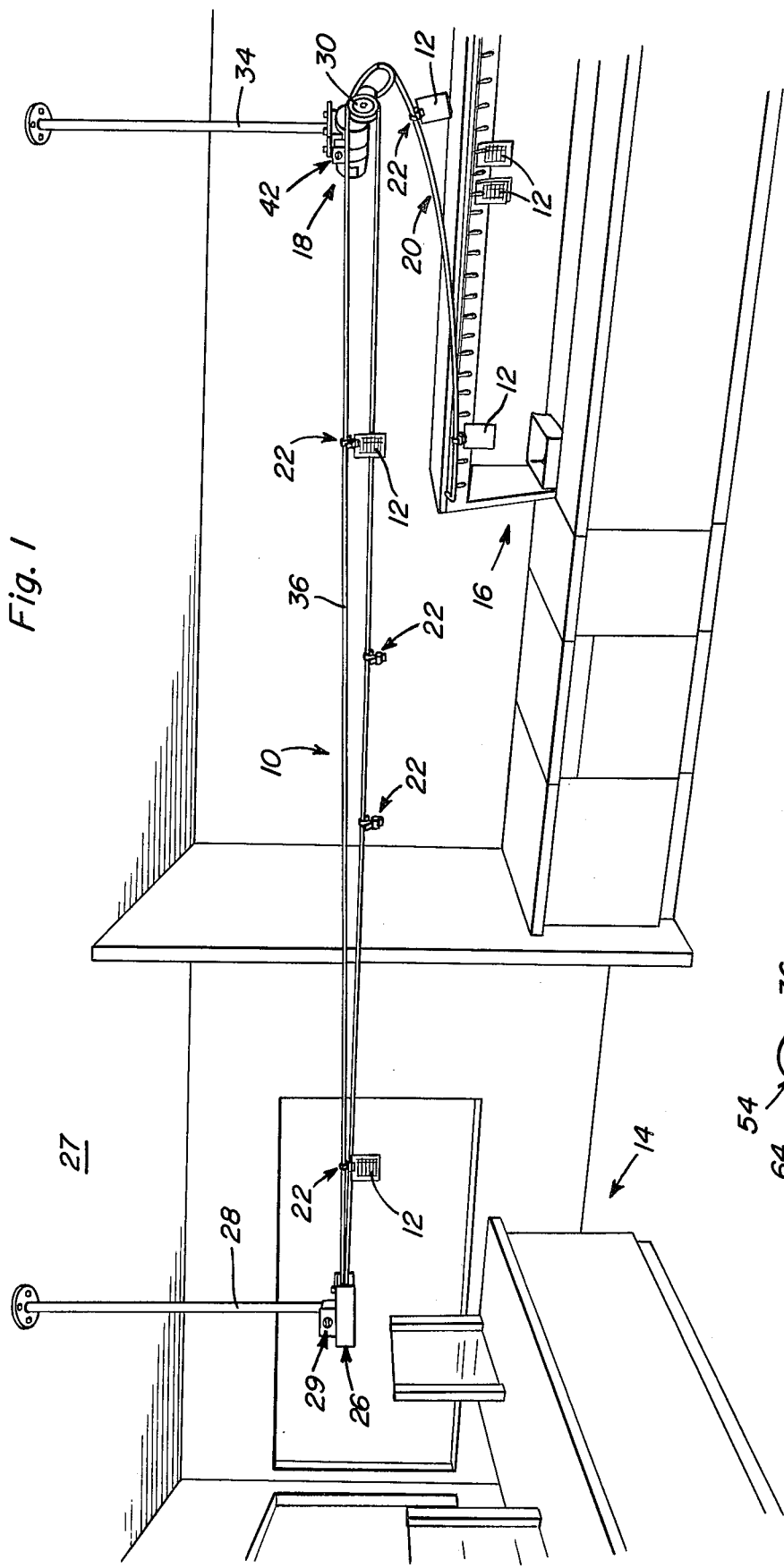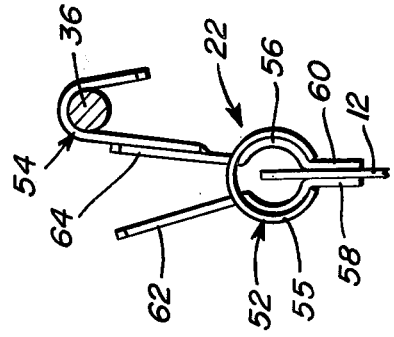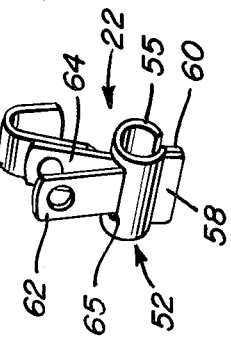

CONVEYOR SYSTEM

BACKGROUND OF THE INVENTION

1. Field of the Invention

This invention relates generally to a conveyor system, and particularly to a system for conveying food orders from a service area to a cooking area, and the like.

2. Description of the Prior Art

In the operation of short order food establishments, and the like, orders taken at a counter or window frequently must be carried to a processing area for filling. Since the concept of such establishments is to process as many orders as is practicable, the desirability of conveying orders to the processing area while the order clerk remains at his post can be readily appreciated.

SUMMARY OF THE INVENTION

It is an object of the present invention to provide apparatus for conveying food orders, and the like, from a service area to an order filling area.

It is another object of the present invention to provide a balanced clip suitable for guiding articles along a conveyor system.

These and other objects are achieved according to the present invention by providing apparatus for conveying food orders from a service area to an order filling area which has: first conveying means for providing a first conveyor path from a first area to a second area, and a separate second conveyor path from the second area to the first area; second conveying means for receiving an order from the first conveyor path at the second area and moving the order to an associated work station; and balanced clips for guiding the order along the first and second conveying means.

The first conveying means preferably is an endless conveyer having an end pulley arranged in the first area rotatable about a vertical axis and an end pulley located in the second area rotatable about a horizontal axis. The second conveying means may be a gravity conveyor arranged adjacent the belt of the endless conveyor at the second end pulley thereof.

A balanced clip according to the present invention includes an article gripping portion and a hook portion connected to the article gripping portion and arranged for selectively engaging the belt of the endless conveyor and the track of the gravity conveyor. The article gripping portion and hook portion are so connected together as to form a clip that is balanced when suspended on the belt. It will be appreciated that in order to readily receive the hook portion, the belt should be a cable, and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing a conveyor system according to the present invention arranged in a short order food establishment.

FIG. 5 is a fragmentary, sectional view taken generally along the line 5—5 of FIG. 4.

FIG. 6 is a perspective view showing a balanced clip for use with the conveyor system according to the present invention.

DESCRIPTION OF THE PREFERRED EMBODIMENTS

Figure 2:
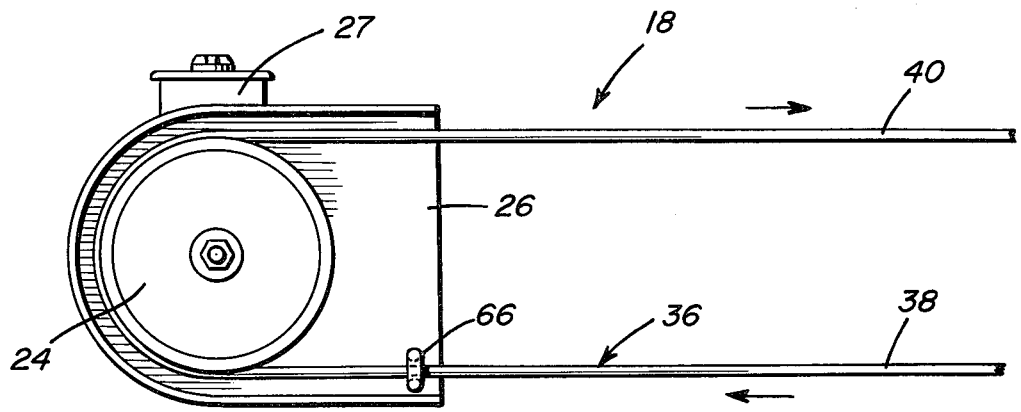
FIG. 2 is a fragmentary, top plan view showing a portion of the conveyor system of FIG. 1.

Referring now more particularly to FIG. 1 of the drawings, a conveyor system 10 according to the present invention forms an apparatus for conveying food orders 12, and the like, from a food service area 14 to an order filling area 16. Although FIG. 1 of the drawings illustrates system 10 being used in a short order food establishment, it is to be understood that such a conveyor system can be used in any suitable environment.

Conveyor system 10 is formed by an endless belt conveyor 18 providing a first conveyor path from area 14 to area 16 and a separate second conveyor path from area 16 to area 14. Cooperating with conveyor 18 is a gravity conveyor 20 arranged for receiving an order 12 from the first conveyor path of conveyor 18 at area 16 and moving the order 12 to an associated work station, such as the illustrated cooking facility. Balanced clips 22 are provided for guiding the orders 12 along conveyors 18 and 20 in a manner to be described in greater detail below.

Figure 3:
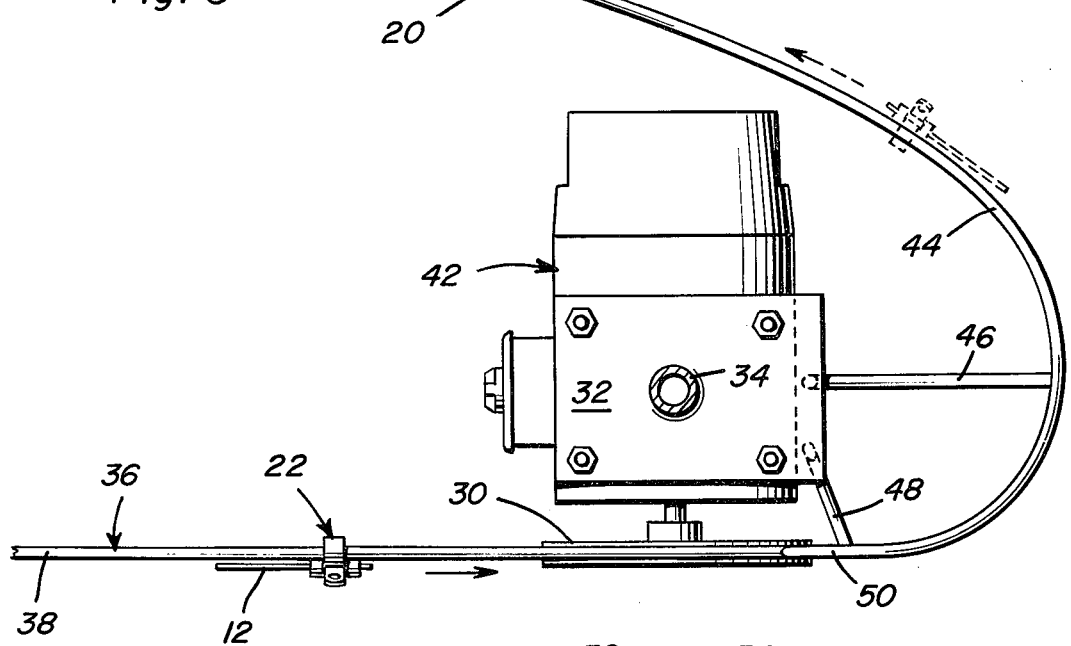
FIG. 3 is a fragmentary, top plan view showing another portion of the conveyor system of FIG. 1.
Figure 4:
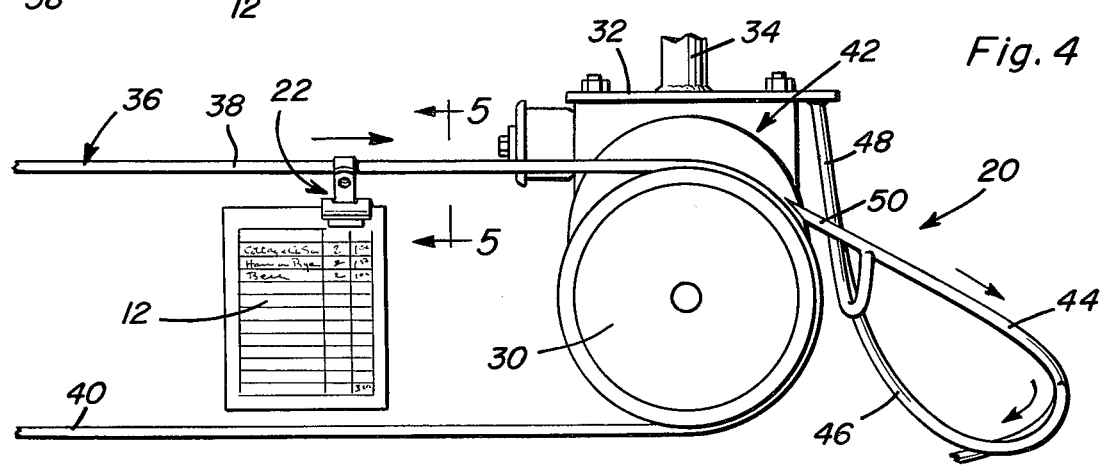
FIG. 4 is a fragmentary, side elevational view showing the conveyor system portion of FIG. 3.

Referring now to FIGS. 2 to 4 of the drawings, conveyor 18 has a pulley 24 mounted in a conventional manner on a bracket 26 for rotation about a substantially vertical axis. This pulley 24 is suspended from the, for example, ceiling 27 in area 14 as by a support 28 (see FIG. 1) connected to ceiling 27 and bracket 26. A conventional switch 29 is also mounted on bracket 26 and is wired to a motor to be described below for controlling movement of conveyor 18. A second end pulley 30 is mounted on a bracket 32 suspended from ceiling 27 as by a support 34 similar to support 28. This pulley 30 is arranged in area 16, and is conventionally mounted for rotation about a substantially horizontal axis. An endless belt 36 is arranged about pulleys 24 and 30 for movement therewith, and forms a pair of runs 38 and 40. Each of the runs 38, 40 forms one of the first and second conveyor paths. For reasons which will become clear, belt 36 is preferably a cable, and the like, constructed from a suitable, known material, such as nylon, and having a, for example, circular cross section. A conventional electric motor 42, and the like, is mounted on a bracket 32 and has its output shaft mounting pulley 30 for selectively rotating same and driving belt 36.

Conveyor 20 is advantageously in the form of the illustrated downwardly inclined track 44 formed from a conventional length of rod constructed from a suitable, known material, such as steel. This track 44 is suspended from bracket 32 as by braces 46 and 48, and has an end 50 arranged adjacent belt 36 at the juncture thereof with end pulley 30 for forming a continuous conveyor path in cooperation with belt run 38 forming the first conveyor path. As can best be seen from FIG. 4 of the drawings, the arrangement of track 44 with respect to run 38 of belt 36 will cause articles being carried by belt 36 to run directly onto rod 44 and down same to the work station.

FIGS. 5 and 6 of the drawings best illustrate a balanced clip 22 according to the present invention especially suited for carrying orders 12, and the like, along conveyor system 10. This clip 22 has an article gripping portion 52 and a hook portion 54 connected to the article gripping portion and arranged for selectively engaging belt 36 and track 44. As can be appreciated from the configuration of hook portion 54, the widths of belt 36 and track 44 must be advantageously relatively narrow. Portions 52 and 54 cooperate to form a clip that is balanced when suspended on belt 36 and track 44.

Article gripping portion 52 has a housing 55 of substantially circular cross section and a longitudinally extending slot. A spring element 56 is arranged within this housing 55 and has extending from element 56 a pair of cooperating jaws 58 and 60. Also extending from element 56 is a pair of members 62 and 64 arranged diametrically opposite jaws 58 and 60. A window 65 is advantageously provided in housing 55 for permitting members 62 and 64 to pass through the housing. The members 62, 64 are arranged for permitting selective application of a counter-bias which will overcome the bias of spring element 56 on jaws 58, 60 and move the jaws to an article releasing position (not shown). Hook portion 54 is connected to one of members 62 and 64, member 64 being illustrated, in order to achieve the desired balance of clip 22. It will be appreciated that spring element 56 normally biases jaws 58 and 60 toward their closed or gripping position.

Referring again to FIG. 2 of the drawings, an eye hook 66 is associated with pulley 24 and mounted on bracket 26 with run 40 forming the second conveyor path passing through eye hook 66. The latter is arranged for stopping clips 22 when same are being moved on the second conveyor path from area 16 to area 14.

Eye hook 66, which is primarily intended to stop clips 22 being returned from going into pulley 24, should be even with the lower part of pulley 24 and the rope, cable, and the like forming belt 36 passes through eye hook 66.

In operation, an employee (not shown) takes an order at the point of origin in area 14. The order 12 is placed on a clip 22 and sent to the grill in area 16 by means of conveyor belt 36. The clip 22 together with its associated order 12 travels on belt 36 over pulley 30 and onto track 44 to the work station where order 12 is filled. The order 12 is taken off of its associated clip 22 and placed with the finished product (not shown) which is sent to the employee who took the order as by passing the product and order down a chute (not shown). Clip 22, minus an order 12, is then returned on the lower half of belt 36, or on run 38, to the original sender thereof so as to be used for another order 12. As mentioned above, eye hook 66 stops clip 22 before it passes to pulley 24.

In an installation such as that illustrated in FIG. 1 of the drawings, a, for example, conventional electric motor having an output shaft rotating at, for example, 50 rpm to turn a pulley 30 of, for example, 5 inches in conjunction with a pulley 24 of, for example, 3 inches has been found satisfactory for actuating a belt 36 constructed from, for example, nylon, and the like. It is to be understood, of course, that the parameters just recited may be varied as desired for a specific installation. Track 44 has sufficient slope to cause the clips 22 to slide the desired distance thereon.

Although the illustrated embodiment is indicated as being used in a fast food establishment, and the like, it is to be understood that a conveyor system 10 according to the present invention may be used for any suitable application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for conveying food orders from a service area to an order filling area, comprising, in combination:
   a. first conveying means for providing a first conveyor path from a first area to a second area, and a separate second conveyor path from the second area to the first area, the first conveying means including:
      i. a first end pulley arranged in the service area and mounted for rotation about a substantially vertical axis;
      ii. a second end pulley arranged at the order filling area and mounted for rotation about a substantially horizontal axis;
      iii. an endless belt arranged about the first and second pulleys for movement therewith and forming a pair of runs, each of the runs forming one of the first and second conveyor paths; and
      iv. means for rotating one of the first and second pulleys;
   b. second conveying means for receiving an order from the first conveyor path at the second area and moving the order to an associated work station, the second conveying means being a downwardly inclined track arranged forming a gravity conveyor, an end of the track arranged adjacent the belt at the juncture thereof with the second end pulley for forming a continuous conveyor path in cooperation with the belt run forming the first conveyor path; and
   c. means for guiding the order along the first and second conveyor means, the means for guiding being a clip including an article gripping portion and a hook portion connected to the article gripping portion and arranged for selectively engaging the belt and track, the article gripping portion and hook portion forming a clip that is balanced when suspended on the belt and track, the article gripping portion including a spring element, jaws connected to the spring element for being biased thereby toward an article gripping position, and a pair of members arranged for selectively applying a counter-bias to overcome the spring element bias and move the jaws to an article releasing position, the hook portion being connected to one of the members, an eye hook being associated with the first pulley and arranged with the run forming the second conveyor path passing thereby for stopping the clip when same is being moved on the second conveyor path.

2. Apparatus for conveying food orders from a service area to an order filling area, comprising, in combination:

a. first conveying means for providing a first conveyor path from a first area to a second area, and a separate second conveyor path from the second area to the first area, the first conveying means including:
   i. a first end pulley arranged in the service area and mounted for rotation about a substantially vertical axis;
   ii. a second end pulley arranged at the order filling area and mounted for rotation about a substantially horizontal axis;
   iii. an endless belt arranged about the first and second pulleys for movement therewith and forming a pair of runs, each of the runs forming one of the first and second conveyor paths; and
   iv. means for rotating one of the first and second pulleys;
b. second conveying means for receiving an order from the first conveyor path at the second area and moving the order to an associated work station; and
c. means for guiding the order along the first and second conveyor means, an eye hook being associated with the first end pulley and arranged with the run forming the second conveyor path passing through the eye hook for stopping the means for guiding when same is being moved on the second conveyor path.

3. A structure as defined in claim 2, wherein the second conveying means is a downwardly inclined track arranged forming a gravity conveyor, an end of the track arranged adjacent the belt at the juncture thereof with the second end pulley for forming a continuous conveyor path in cooperation with the belt run forming the first conveyor path.

4. A structure as defined in claim 2, wherein the means for guiding is a clip including an article gripping portion and a hook portion connected to the article gripping portion and arranged for selectively engaging the belt, the article gripping portion and hook portion forming a clip that is balanced when suspended on the belt.

5. A structure as defined in claim 4, wherein the article gripping portion includes a spring element, jaws connected to the spring element for being biased thereby toward an article gripping position, and a pair of members arranged for selectively applying a counter-bias to overcome the spring element bias and move the jaws to an article releasing position, the hook portion being connected to one of the members.

* * * * *